United States Patent
Zhang et al.

(10) Patent No.: US 12,261,660 B2
(45) Date of Patent: Mar. 25, 2025

(54) ASYMMETRIC MASSIVE MIMO CHANNEL ESTIMATION METHOD BASED ON CO-PRIME ARRAY

(71) Applicant: NANJING UNIVERSITY OF POSTS AND TELECOMMUNICATIONS, Jiangsu (CN)

(72) Inventors: Jun Zhang, Jiangsu (CN); Jiacheng Lu, Jiangsu (CN); Shu Cai, Jiangsu (CN); Hairong Wang, Jiangsu (CN); Wenjun Lv, Jiangsu (CN); Hongbo Zhu, Jiangsu (CN)

(73) Assignee: NANJING UNIVERSITY OF POSTS AND TELECOMMUNICATIONS (CN)

(*) Notice: Subject to any disclaimer, the term of this patent is extended or adjusted under 35 U.S.C. 154(b) by 0 days.

(21) Appl. No.: 18/256,981

(22) PCT Filed: Aug. 16, 2022

(86) PCT No.: PCT/CN2022/112628
§ 371 (c)(1),
(2) Date: Jun. 12, 2023

(87) PCT Pub. No.: WO2023/130726
PCT Pub. Date: Jul. 13, 2023

(65) Prior Publication Data
US 2024/0364389 A1    Oct. 31, 2024

(30) Foreign Application Priority Data
Jan. 7, 2022    (CN) .................. 202210014946.8

(51) Int. Cl.
*H04B 7/0413* (2017.01)
*H04L 25/02* (2006.01)

(52) U.S. Cl.
CPC ....... *H04B 7/0413* (2013.01); *H04L 25/0204* (2013.01); *H04L 25/022* (2013.01); *H04L 25/024* (2013.01)

(58) Field of Classification Search
CPC . H04B 7/0413; H04L 25/0204; H04L 25/022; H04L 25/024
See application file for complete search history.

(56) References Cited

U.S. PATENT DOCUMENTS

2010/0215081 A1*   8/2010   Bajwa ................... H04B 1/711
                                                          455/352
2018/0287822 A1*  10/2018   Wang .................. H04L 25/0202

\* cited by examiner

*Primary Examiner* — Jean B Corrielus

(57) ABSTRACT

A downlink channel estimation method based on a co-prime array in asymmetric massive MIMO architecture is provided. First, an uplink and downlink asymmetric receiving and transmitting system model based on a co-prime array is established, and a deviation of the frequency domain direction caused by array broadband signals is observed; then, uplink receiving is performed to estimate an uplink channel, and channel parameters such as the number of paths, the angle of arrival and the path gain are recovered; and finally, a downlink channel is reconstructed based on the channel parameters recovered according to the uplink channel. By means of the high angular resolution of the co-prime array, the problem that a recovered uplink channel cannot be directly used for pre-coding of a downlink channel is solved.

7 Claims, 2 Drawing Sheets

ASYMMETRIC MASSIVE MIMO CHANNEL ESTIMATION METHOD BASED ON CO-PRIME ARRAY

FIELD

The invention relates to an asymmetric massive Multiple Input Multiple Output (MIMO) channel estimation method based on a co-prime array, and belongs to the technical field of wireless communication.

BACKGROUND

It is known that the massive MIMO technique is further applied to and developed in the widely deployed fifth-generation mobile communication system, and shows superior properties of MIMO arrays in rate, spectrum efficiency and reliability. To meet the increasingly higher requirements for rate and reliability, a further improvement of the scale of MIMO arrays is desired, accompanied by a high hardware cost, a heavy data processing burden and high power consumption that limit a further development of the full-digital massive MIMO technique. Although there have been many documents that purposed different alternative schemes, such as hybrid beam forming, low-precision digital-to-analog/analog-to-digital converters, antenna selection, all these techniques inevitably sacrifice part of the communication performance, which is not undesired in diversified network services with an increasingly higher rate requirement. To minimize the cost of base stations without compromising user experience, scholars recently purposed a novel full-digital asymmetric receiving and transmitting architecture, the asymmetry of which is embodied in the difference between the uplink receiving process and the downlink transmitting process, that is, by decoupling receiving and transmitting radio-frequency links, only part of antennas are used for receiving signals during uplink communication, and all the antennas are used for transmitting signals during downlink communication. The original intention of this design concept is based on the difference of uplink and downlink communication requirements. During downlink communication, the rate is the most intuitive indicator that has an influence on user experience. During uplink communication, the data throughout is much smaller than that in downlink communication, so the requirement for searching for base station information can be met by part of antennas during uplink communication. In this design, because the number of uplink antennas is different from the number of downlink antennas, a difference in angular resolution will be caused, making downlink channel information unreliable and inaccurate.

SUMMARY

The technical issue to be settled by the invention is to overcome the defects of the prior art by providing an asymmetric massive MIMO channel estimation method based on a co-prime array for broadband multi-frequency point communication, which can avoid the difference in angular resolution caused by the difference in the number of antennas of uplink and downlink arrays and can effectively guarantee the reliability and accuracy of reconstructed downlink channel information.

The invention provides an asymmetric massive MIMO channel estimation method based on a co-prime array, which comprises:

S1: establishing an uplink and downlink asymmetric massive MIMO system based on a co-prime array, wherein the uplink and downlink asymmetric massive MIMO system comprises a base station provided with ultra-large-scale antennas and users of K antennas, the number of the antennas of the base station is M, all the antennas of the base station have transmitting radio-frequency links, only $N(N \ll M, K \leq N)$ receiving radio-frequency links are available to be connected to N antennas to receive uplink signals, and the users communicate with the base station by means of Q frequency points; $M=mn+1$, and $N=m+n-1$, where $m<n$, and m and n are co-prime; selecting uplink receiving antennas according to a co-prime array, and connecting the selected uplink receiving antennas to the receiving radio-frequency links;

S2: receiving and estimating, by the base station, uplink channel information of part of the antennas, and constructing, after the uplink channel information is transformed to a frequency domain and is screened and rearranged, a virtual linear uniform array;

S3: constructing a group least absolute shrinkage and selection operator based on compressive sensing by means of spatial sparse characteristics to estimate a direction of arrival;

S4: reconstructing a partial array manifold matrix according to the estimated direction of arrival, and estimating path gain according to instantaneous channel information observed in the frequency domain later; and S5: reconstructing a complete uplink channel according to the estimated path gain and direction of arrival, and transferring it to a downlink channel based on reciprocity.

The invention designs a channel estimation method for part of antennas based on a co-prime array in an asymmetric receiving and transmitting architecture, part of antennas are used to effectively and reliably recover complete array channel information to overcome a rate loss caused by the difference of uplink and downlink channels. In the communication system proposed by the invention, the number of required uplink antennas, the number of required downlink antennas, and the specific positions of actually activated uplink antennas are determined according to a nested co-prime array; then, FFT is performed on pilot signals received by the activated uplink antennas, frequency-domain channel information of frequency points is separated in the frequency domain, and autocorrelation processing is performed on frequency domain signals on the frequency points to extract virtual array element signals, which are then screened and rearranged to form a virtual linear uniform array; next, virtual array information on all the frequency points is stretched to form a vector to construct an observation matrix, solution vectors are solved according to an iterative formula of an alternating direction method of multipliers (ADMM) optimization framework, the solution vectors are sorted to select a path to obtain a direction of arrival, an uplink array manifold is reconstructed according to the direction of arrival, and path gain is obtained through least square; and finally, a complete downlink array is reconstructed according to the previously estimated direction of arrival and path gain. The asymmetry in channel information and resolution caused by the difference in the number of antennas of uplink and downlink arrays is avoided by means of a co-prime array, and estimated uplink channel information can be directly used for downlink pre-coding in the time division duplex mode, so the communication rate of an asymmetric receiving and transmitting architecture is effectively guaranteed.

A further optimized technical solution of the invention is as follows:

In S1, all antennas in a downlink array are used for transmitting signals to maximize the communication rate, and only antennas which are activated according to the arrangement of a co-prime matrix are to receive uplink signals to reduce the uplink signal receiving and decoding pressure. Specifically:

S101: separately designing circuits of the receiving and transmitting radio-frequency links of the M antennas, wherein the number of the transmitting radio-frequency links is M, the number of the receiving radio-frequency links is N, M=mn+1, N=m+n−1, where m<n, and m and n are co-prime;

S102: selecting uplink receiving antennas according to a co-prime array, and connecting the selected uplink receiving antennas to the receiving radio-frequency links, wherein the uplink receiving antennas are selected specifically by: selecting N antennas which comprise first consecutive n antennas, $(2n+1)^{th}$ antenna, $(3n+1)^{th}$ antenna, . . . , and $(mn+1)^{th}$ antenna, where N=m+n−1, a distance d between the antennas is $\lambda_{min}/2$, and $\lambda_{min}$ is a wavelength corresponding to a subcarrier with a maximum frequency in each frequency point.

In S1, the uplink receiving antennas are selected specifically by: selecting N antennas which comprise first consecutive n antennas, $(2n+1)^{th}$ antenna, $(3n+1)^{th}$ antenna, . . . , and $(mn+1)^{th}$ antenna, wherein N=m+n−1 (m and n are two co-prime numbers used for designing the number of uplink antennas and the number of downlink antennas in asymmetric arrays). The distance d between the antennas is $\lambda_{min}/2$, and $\lambda_{min}$ is the wavelength corresponding to the subcarrier with the maximum frequency in each frequency point.

In S2, receiving and estimating, by the base station, uplink channel information of part of the antennas and constructing, after the uplink channel information is transformed to a frequency domain and is screened and rearranged, a virtual linear uniform array specifically comprise:

S201: within P successive symbol durations, respectively performing Q-point fast Fourier transform (FFT) on P groups of Q discrete time-domain signals received by an uplink array to obtain frequency domain signals on the P groups of Q frequency points, wherein a column vector $x_{p,q}$ with a length N×1 is denoted as the frequency domain signal corresponding to a $q^{th}$ frequency point in a $P^{th}$ group of signals;

S202: performing autocorrelation processing on the P frequency domain signals on each frequency point to obtain Q N×N autocorrelation matrixes:

$$R_q = \frac{1}{P}\sum_{p=1}^{P} x_{p,q} x_{p,q}^H, \text{ for } q = 1, \ldots, Q,$$

Classifying (the upper triangle corresponding to a negative lag is grounded) and averaging array elements at repetitive positions in $R_q$, and then arranging the array elements in sequence to form a column vector $y_q$ with a length M×1, wherein $[\bullet]^H$ represents conjugate transposition, and $[\bullet]^T$ represents transposition; and S203: forming a column vector with a length QM by virtual array signals on all the frequency points:

$$\bar{y}_f = [y_1^T, \ldots y_i^T \ldots, y_Q^T]^T$$

Where, a column vector $y_i$ with a length M is the frequency signal on an $i^{th}$ frequency point, and $[\bullet]^T$ represents transposition.

A specific selection process in S202 comprises:

From one end of a complete array, denoting serial numbers of the antennas as 0, 1, 2, . . . , M−1, denoting the serial number of an activated uplink antenna array as a set $\{p_1, p_2, \ldots, p_N\}$ with a length N, and arranging the set by column to form a matrix $T_c$ with a length N×N:

$$T_c = \underbrace{\begin{bmatrix} p_1 & \cdots & p_1 \\ \vdots & \underset{N columns}{\cdots} & \vdots \\ p_N & \cdots & p_N \end{bmatrix}}_{N columns};$$

Wherein, elements in the autocorrelation matrix $R_q$ are in one-to-one correspondence with elements in $R_{tab}=T_c-T_c^T$, that is, an element $[R_q]_{i,j}$ in the $i^{th}$ row and $j^{th}$ column of $R_q$ is an element at the position $[R_{tab}]_{i,j}$ of the virtual array.

In S3, an estimation problem is constructed by means of the group least absolute shrinkage and selection operator based on compressive sensing and is solved in an ADMM optimization framework to estimate the direction of arrival, which specifically comprises:

S301: constructing an observation matrix $\bar{A}=[A_1, \ldots A_i, \ldots, A_w, \bar{I}]$ of QM×Q(w+1) within a preset incident angle interval $[\theta_l, \theta_r]$, wherein $\theta_l, \theta_r$ are a left angle boundary and a right angle boundary respectively and meet $0 \leq \theta_l < \theta_r \leq \pi$, the two angle boundaries are obtained through an angle domain detection method such as discrete Fourier transform (DFT); if the detection is not performed, $\theta_l=0, \theta_r=\pi$; w is the number of grid points within an estimation interval $[\theta_l, \theta_r]$, and with the increase of w, the accuracy of an estimation result is higher, and the complexity is also improved; a sub-matrix $A_i$ of QM×Q is an observation matrix on an $i^{th}$ grid point, $\bar{I}$ is a matrix used for noise estimation, and the sub-matrixes are generated by:

$$A_i = \begin{bmatrix} a_{i,1} & \cdots & 0 \\ \vdots & \ddots & \vdots \\ 0 & \cdots & a_{i,Q} \end{bmatrix}, \bar{I} = \begin{bmatrix} e_1 & \cdots & 0 \\ \vdots & \ddots & \vdots \\ 0 & \cdots & e_1 \end{bmatrix},$$

Where, all ellipses are 0, $a_{i,1}$ is a steering vector of the first frequency point on the $i^{th}$ grid point, $a_{i,Q}$ is a steering vector of the $Q^{th}$ frequency point on the $i^{th}$ grid point, $a_{i,q}$ is a steering vector of the $q^{th}$ frequency point on the $i^{th}$ grid point, and:

$$a_{i,q} = \left[1, e^{-j2\pi \frac{d}{\lambda_q} \cos\left(\theta_l + i \frac{\theta_r - \theta_l}{w}\right)}, \ldots, e^{-j2\pi \frac{d}{\lambda_q} \cos\left(\theta_l + i \frac{\theta_r - \theta_l}{w}\right)(M-1)}\right]^T,$$

$$e_1 = [1, 0, \ldots, 0]^T,$$

Where, the length of $e_1$ is M, j is an imaginary unit, i is a sequence of the grid points, $$\frac{\theta_r - \theta_l}{w}$$

is a distance between the grid points, $$\theta_l + i\frac{\theta_r - \theta_l}{w}$$

is an angle represented by the $i^{th}$ grid point, and $\lambda_q$ is a wavelength corresponding to the $q^{th}$ frequency point;

S302: writing out a linear regression problem constrained by L21 norm in the alternating direction method of multipliers (ADMM) framework based on compressive sensing:

$$\min_{\bar{x} \geq 0} \frac{1}{2}\|\bar{A}\bar{x} - \bar{y}_f\|_2^2 + \lambda_t \sum_{i=1}^{w+1}\|z_i\|_2$$

$$s.t. \ \bar{z} = \bar{x},$$

Where, a column vector $\bar{x}=[x_1^T, \ldots, x_{w+1}^T]^T$ with a length $Q(w+1)$ is a target variable to be solved and represents the magnitude of energy of the frequency points on the estimated grid points, $x_1$ is a sub-vector formed by elements from element $(1-1)Q+1$ to element $1Q$ of $\bar{x}$, $x_{w+1}$ is a sub-vector formed by elements from element $(w+1-1)Q+1$ to element $w+1Q$ of $\bar{x}$, $x_i$ is a sub-vector formed by elements from element $(i-1)Q+1$ to element $iQ$ of $\bar{x}$, $z_1$ is a sub-vector formed by elements from element $(1-1)Q+1$ to element $1Q$ in $\bar{z}$, $z_{w+1}$ is a sub-vector formed by elements from element $(w+1-1)Q+1$ to element $(w+1)Q$ in $\bar{z}$, $z_i$ is a sub-vector formed by elements from element $(i-1)Q+1$ to element $iQ$ of $\bar{z}$, $\bar{z}=[z_1^T, \ldots, z_{w+1}^T]^T$ is an auxiliary variable, $\lambda_t$ is a penalty coefficient, $\|\bullet\|_2$ represents taking the 2-norm of a target vector, and a formula of a $(k+1)$th iteration of the problem is:

$$\bar{x}^{(k+1)} = \left(\Re(\bar{A}^H\bar{A}) + \rho I\right)^{-1}\left[\Re(\bar{A}^H\bar{y}_f) + \bar{u}^{(k)} + \rho\bar{z}^{(k)}\right],$$

$$z_i^{(k+1)} = \left(1 - \frac{\lambda_t}{\rho\left\|x_i^{(k+1)} - \frac{1}{\rho}u_i^{(k)}\right\|_2}\right)\left(x_i^{(k+1)} - \frac{1}{\rho}u_i^{(k)}\right), \text{ for } i = 1, 2, \ldots, w+1,$$

$$\bar{u}^{(k+1)} = \bar{u}^{(k)} + \rho(\bar{z}^{(k+1)} - \bar{x}^{(k+1)}),$$

Where, $I$ is a unit matrix, $\bar{u}=[u_1^T, \ldots, w_{w+1}^T]^T$ is an auxiliary variable, $u_1$ is a sub-T vector formed by elements from element $(1-1)Q+1$ to element $1Q$ of $\bar{u}$, $u_{w+1}$ is a sub-vector formed by elements from element $(w+1-1)Q+1$ to element $(w+1)Q$ of $\bar{u}$, $u_i$ is a sub-vector formed by elements from element $(i-1)Q+1$ to element $iQ$ of $\bar{u}$, the definition of $u_i$ is similar to that of $x_i$, the superscript $(\bullet)^{(k)}$ represents a variable value of a $k^{th}$ iteration, $\rho$ is an iteration step and may be a constant value, $\Re(\bullet)$ represents taking a rear part of a complex number, $x_i^{(k+1)}$ is a sub-vector formed by elements from element $(i-1)Q+1$ to element $iQ$ of a vector $\bar{x}^{(k+1)}$ generated by the $(k+1)^{th}$ iteration, and a convergence condition is:

$$\left\|\bar{x}^{(k+1)} - \bar{x}^{(k)}\right\|_2 \leq \varepsilon,$$

$\bar{x}^{(k)}$ is a vector obtained by a $k^{th}$ iteration of the target variable $\bar{x}$, and $\varepsilon$ is a convergence threshold, which is a small constant greater than 0; and S303: calculating an energy distribution vector $\bar{x}_{L1(2)}=[\|x_1\|_2, \ldots, \|x_{w+1}\|_2]^T$ of the estimated grid points (in the spatial direction) according to a solution $\bar{x}=[x_1^T, \ldots, x_{w+1}^T]^T$ obtained in S302, sorting elements in $\bar{x}_{L1(2)}$, denoting sorted as $\bar{x}_{L1(2)}$ as $\tilde{x}_{L1(2)}$, and selecting first $\hat{L}$ elements in $\tilde{x}_{L1(2)}$, which meet:

$$\frac{\sum_{i=1}^{\hat{L}-1}[\tilde{x}_{L1(2)}]_i}{\|\bar{x}_{L1(2)}\|_1} < \eta \leq \frac{\sum_{i=1}^{\hat{L}}[\tilde{x}_{L1(2)}]_i}{\|\bar{x}_{L1(2)}\|_1},$$

Where, $\eta$ is a path recovery threshold and meets $0<\eta<1$, $\|\bullet\|_1$ represents taking the 1-norm of the target vector, $[\bullet]_i$ represents an $i^{th}$ element of the vector, a set formed by subscripts, corresponding to the recovered $\hat{L}$ elements, in the vector $\bar{x}_{L1(2)}$ is denoted as $L=\{\tilde{i}_1, \tilde{i}_2, \ldots \tilde{i}_l \ldots, \tilde{i}_{\hat{L}}\}$, $\tilde{i}_1$ is an original index of the first element in $\bar{x}_{L1(2)}$, $\tilde{i}_2$ is an original index of the second element in $\bar{x}_{L1(2)}$, $\tilde{i}_{\hat{L}}$ is an original index of an $\hat{L}^{th}$ selected element in $\bar{x}_{L1(2)}$, $\tilde{i}_l$ is an original index of an $l^{th}$ selected element in $\bar{x}_{L1(2)}$, and a vector of the direction of arrival of $\hat{L}$ paths in space is:

$$\hat{\theta} = \left[\theta_l + \tilde{i}_1\frac{\theta_r - \theta_l}{w}, \ \theta_l + \tilde{i}_2\frac{\theta_r - \theta_l}{w}, \ \ldots, \ \theta_l + \tilde{i}_{\hat{L}}\frac{\theta_r - \theta_l}{w}\right].$$

In Step 4, reconstructing a partial array manifold matrix according to the estimated direction of arrival and estimating path gain according to instantaneous channel information observed in the frequency domain later specifically comprise:

S401: performing FFT on time-domain signals on N actual receiving antennas to obtain Q frequency domain column vector signals with a length N, which are denoted as $\tilde{y}_q$, wherein 9 is the $q^{th}$ frequency point; constructing the partial array manifold matrix $\tilde{A}_q$ (the size is $N\times\hat{L}$) is of uplink receiving antennas on the frequency points, wherein q is the $q^{th}$ frequency point:

$$\tilde{A}_q=[\tilde{a}_{1,q}, \tilde{a}_{2,q}, \ldots \tilde{a}_{i,q} \ldots, \tilde{a}_{\hat{L},q}],$$

Where, $\tilde{a}_{1,q}, \tilde{a}_{2,q}, \tilde{a}_{i,q}$ and $\tilde{a}_{\hat{L},q}$ are steering vectors of the actual activated uplink antennas:

$$\tilde{a}_{i,q} = \left[e^{-j2\pi\frac{d}{\lambda_q}p_1\cos\left(\theta_l+\frac{\theta_r-\theta_l}{w}\right)}, e^{-j2\pi\frac{d}{\lambda_q}p_2\cos\left(\theta_l+\frac{\theta_r-\theta_l}{w}\right)}, \ldots, \right.$$
$$\left. e^{-j2\pi\frac{d}{\lambda_q}p_n\cos\left(\theta_l+\frac{\theta_r-\theta_l}{w}\right)}, \ldots, e^{-j2\pi\frac{d}{\lambda_q}p_N\cos\left(\theta_l+\frac{\theta_r-\theta_l}{w}\right)}\right]^T,$$

$p_n$ is a sequence corresponding to the selected antennas in the uplink array, $p_n=\in\{0, 1, 2, \ldots, M-1\}$, $i\in L$;

S402: sequentially solving path gain of the paths on the Q frequency points, wherein a gain vector $\hat{\alpha}_q$ of the $\hat{L}$ paths on the q frequency points is:

$$\hat{\alpha}_q = \left(\tilde{A}_q^H \tilde{A}_q + \kappa I\right)^{-1}\tilde{A}_q^H \tilde{y}_1$$

Where, each element in $\hat{\alpha}_q$ corresponds to the path gain of each path, $\kappa$ is a minimal constant for ensuring nonsingularity of the matrix during an inversion process.

In S5, reconstructing a complete uplink channel according to the path gain estimated in S402 and the direction of arrival estimated in S303 and transferring it to a downlink channel based on reciprocity specifically comprise:

Respectively reconstructing complete M×L̂ array manifold matrixes of the uplink receiving antennas on the Q frequency points by:

$$\tilde{A}_q = [\hat{a}_{1,q}, \hat{a}_{2,q}, \ldots \hat{a}_{i,q} \ldots, \hat{a}_{\hat{L},q}], \text{ for } q = 1, 2, \ldots, Q,$$

Where, $\hat{a}_{1,q}$ is a complete steering vector of the $q^{th}$ frequency point at a first angle, $\hat{a}_{2,q}$ is a complete steering vector of the $q^{th}$ frequency point at a second angle, $\hat{a}_{\hat{L},q}$ is a complete steering vector of the $q^{th}$ frequency point at an $L^{th}$ angle, and $\hat{a}_{i,q}$ is a complete steering vector of the $q^{th}$ frequency point at an $i^{th}$ angle:

$$\hat{a}_{i,q} = \left[1, e^{-j2\pi \frac{d}{\lambda_q} \cos\left(\theta_l + i \frac{\theta_r - \theta_l}{w}\right)}, \ldots, e^{-j2\pi \frac{d}{\lambda_q}(M-1)\cos\left(\theta_l + i \frac{\theta_r - \theta_l}{w}\right)}\right]^T, i \in L,$$

Reconstructing M×1 complete channels of all the antennas:

$$\hat{h}_q = \tilde{A}_q \hat{\alpha}_q, \text{ for } q = 1, 2, \ldots, Q.$$

In a time division duplex mode, $\hat{h}_q$ is a downlink channel matrix corresponding to the $q^{th}$ frequency point, and a complete downlink channel is:

$$\hat{H} = [\hat{h}_1, \ldots \hat{h}_q \ldots, \hat{h}_Q]$$

Where, $\hat{h}_1$ is a downlink channel matrix corresponding to the first frequency point, and $\hat{h}_Q$ is the downlink channel matrix corresponding to the $q^{th}$ frequency point.

To sum up, the invention provides a downlink channel estimation method based on a co-prime array in asymmetric massive MIMO architecture. First, an uplink and downlink asymmetric receiving and transmitting system model based on a co-prime array is established, and a deviation of the frequency domain direction caused by array broadband signals is observed; then, uplink receiving is performed to estimate an uplink channel, and channel parameters such as the number of paths, the angle of arrival and the path gain are recovered; and finally, a downlink channel is reconstructed based on the channel parameters recovered according to the uplink channel, and for broadband signals, the channel estimation accuracy can be improved by means of the sparse characteristics of different frequency points. By means of the high angular resolution of the co-prime array, the problem that a recovered uplink channel cannot be directly used for pre-coding of a downlink channel is solved. A complete a downlink channel can be estimated by effectively using part of antennas in an asymmetric architecture, thus reducing the uplink receiving pressure and improving the channel recovery accuracy.

Compared with the prior art, the invention adopting the above technical solution has the following technical effects:

(1) In the invention, an original channel estimation process is converted into a parameter estimation problem by fully using the sparse multi-path characteristics of high-frequency signals in an asymmetric receiving and transmitting architecture, and the direction of arrival is accurately estimated in an alternating direction method of multipliers (ADMM) optimization framework by means of a group least absolute shrinkage and selection operator based on compressive sensing, such that the overall channel estimation accuracy is guaranteed, and the sparse characteristics of a channel model are ensured to prevent errors in the subsequent fitting process.

(2) A co-prime array is introduced in an uplink array of an asymmetric architecture, such that the difference in resolution of uplink and downlink arrays is eliminated, and the accuracy of a reconstructed channel and the validity of channel information for downlink pre-coding are guaranteed, thus increasing the transmission rate of a system.

DETAILED DESCRIPTION

The technical solution of the invention will be described in further detail below in conjunction with accompanying drawings. The following embodiment is implemented based on the technical solution of the invention and provides a detailed implementation and a specific operation process, but the protection scope of the invention is not limited to the following embodiment.

Figure 1:
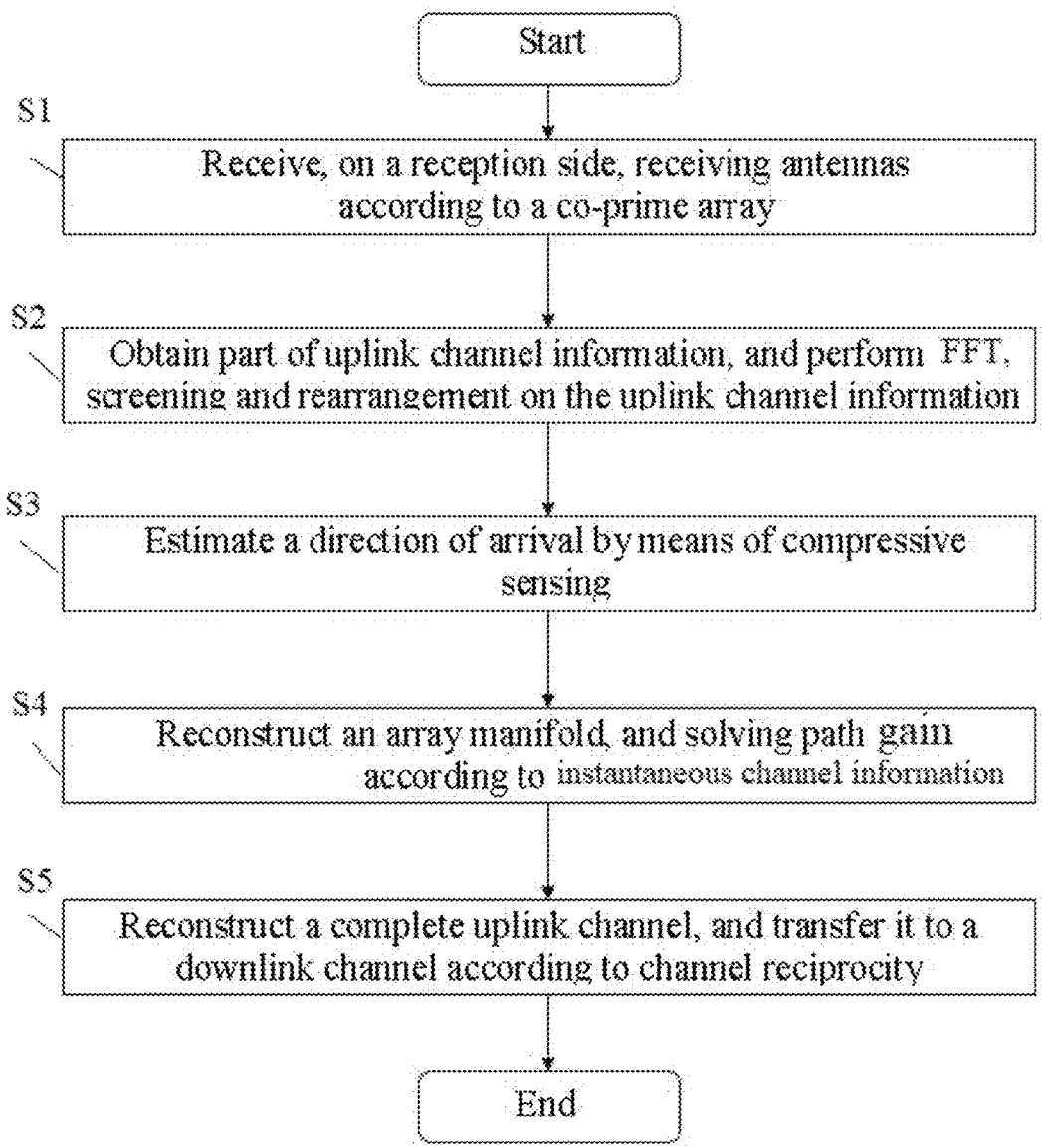
FIG. 1 is a flow diagram of the invention.
Figure 2:
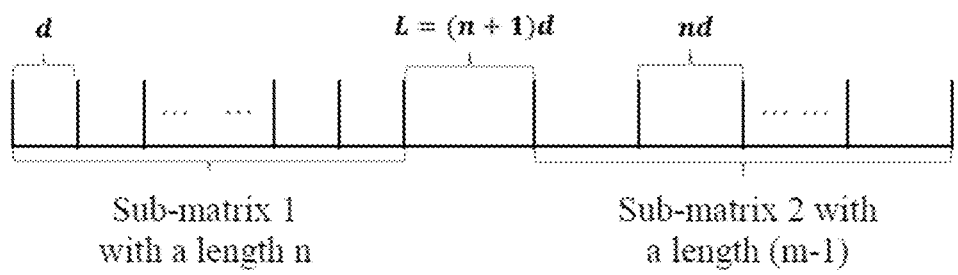
FIG. 2 is a schematic diagram of the selection of uplink receiving antennas according to the invention.

This embodiment provides an asymmetric massive MIMO channel estimation method based on a co-prime array, which, as show in FIG. 1, comprises the following steps:

S1: establishing an uplink and downlink asymmetric massive MIMO system based on a co-prime array, wherein the uplink and downlink asymmetric massive MIMO system comprises a base station provided with ultra-large-scale antennas (the number of the antennas is M) and users of K antennas, all the antennas of the base station have transmitting radio-frequency links, only N(N<<M, K≤N) receiving radio-frequency links are available to be connected to N antennas to receive uplink signals, and the users communicate with the base station by means of Q frequency points; M=mn+1, and N=m+n−1, where m<n, and m and n are co-prime; selecting uplink receiving antennas according to a co-prime array, and connecting the selected uplink receiving antennas to the receiving radio-frequency links, wherein the uplink receiving antennas are selected specifically by: selecting N antennas which comprise first consecutive n antennas, $(2n+1)^{th}$ antenna, $(3n+1)^{th}$ antenna, . . . , and $(mn+1)^{th}$ antenna, wherein N=m+n−1 (m and n are two co-prime numbers used for designing the number of uplink antennas and the number of downlink antennas in asymmetric arrays), a distance d between the antennas is $\lambda_{min}/2$, and $\lambda_{min}$ is a wavelength corresponding to a subcarrier with a maximum frequency in each frequency point.

S2: receiving and estimating, by the base station, uplink channel information of part of the antennas, and constructing, after the uplink channel information is transformed to a frequency domain and is screened and rearranged, a virtual linear uniform array, which specifically comprise:

S201: within P successive symbol durations, respectively performing Q-point fast Fourier transform (FFT) on P groups of Q discrete time-domain signals received by an uplink array to obtain frequency domain signals on the P groups of Q frequency points, wherein a column vector $x_{p,q}$ with a length N×1 is denoted as the frequency domain signal corresponding to a $q^{th}$ frequency point in a $P^{th}$ group of signals;

S202: performing autocorrelation processing on the P frequency domain signals on each frequency point to obtain Q N×N autocorrelation matrixes:

$$R_q = \frac{1}{P}\sum_{p=1}^{P} x_{p,q} x_{p,q}^H, \text{ for } q = 1, \ldots, Q,$$

Classifying (the upper triangle corresponding to a negative lag is grounded) and averaging array elements at repetitive positions in $R_q$, and then arranging the array elements in sequence to form a column vector $y_q$ with a length M×1, wherein $[\bullet]^H$ represents conjugate transposition, and $[\bullet]^T$ represents transposition; a specific selection process comprises:

From one end of a complete array, denoting serial numbers of the antennas as 0, 1, 2, ..., M−1, denoting the serial number of an activated uplink antenna array as a set $\{p_1, p_2 > \ldots, p_N\}$ with a length N, and arranging the set by column to form a matrix $T_c$ with a length N×N:

$$T_c = \underbrace{\begin{bmatrix} p_1 & \cdots & p_1 \\ \vdots & \cdots & \vdots \\ p_N & \cdots & p_N \end{bmatrix}}_{N\,columns}$$

Wherein, elements in the autocorrelation matrix $R_q$ are in one-to-one correspondence with elements in $R_{tab} = T_c - T_c^T$, that is, an element $[R_q]_{i,j}$ in the $i^{th}$ row and $j^{th}$ column of $R_q$ is an element at the position $[R_{tab}]_{i,j}$ of the virtual array;

S203: forming a column vector with a length QM by virtual array signals on all the frequency points:

$$\bar{y}_f = [y_1^T, \ldots y_i \ldots, y_Q^T]^T,$$

Where, a column vector $y_i$ with a length M is the frequency signal on an $i^{th}$ frequency point, and $[\bullet]^T$ represents transposition;

S3: constructing a group least absolute shrinkage and selection operator based on compressive sensing by means of spatial sparse characteristics to estimate a direction of arrival, which specifically comprise:

S301: constructing an observation matrix $\bar{A} = [A_1, \ldots, A_i, \ldots, A_w, \bar{I}]$ of QM×Q(w+1) within a preset incident angle interval $[\theta_l, \theta_r]$, wherein $\theta_l, \theta_r$ are a left angle boundary and a right angle boundary respectively and meet $0 \le \theta_l < \theta_r \le \pi$, the two angle boundaries are obtained through an angle domain detection method such as discrete Fourier transform (DFT); if the detection is not performed, $\theta_l = 0, \theta_r = \pi$; w is the number of grid points within an estimation interval $[\theta_l, \theta_r]$, and with the increase of w, the accuracy of an estimation result is higher, and the complexity is also improved; a sub-matrix $A_i$ of QM×Q is an observation matrix on an $i^{th}$ grid point, $\bar{I}$ is a matrix used for noise estimation, and the sub-matrixes are generated by:

$$A_i = \begin{bmatrix} a_{i,1} & \cdots & 0 \\ \vdots & \ddots & \vdots \\ 0 & \cdots & a_{i,Q} \end{bmatrix},$$

$$\bar{I} = \begin{bmatrix} e_1 & \cdots & 0 \\ \vdots & \ddots & \vdots \\ 0 & \cdots & e_1 \end{bmatrix},$$

Where, all ellipses are 0, $a_{i,1}$ is a steering vector of the first frequency point on the $i^{th}$ grid point, $a_{i,Q}$ is a steering vector of the $Q^{th}$ frequency point on the $i^{th}$ grid point, $a_{i,q}$ is a steering vector of the $q^{th}$ frequency point on the $i^{th}$ grid point, and:

$$a_{i,q} = \left[1, e^{-j2\pi \frac{d}{\lambda_q}\cos\left(\theta_l + i\frac{\theta_r-\theta_l}{w}\right)}, \ldots, e^{-j2\pi \frac{d}{\lambda_q}\cos\left(\theta_l + i\frac{\theta_r-\theta_l}{w}\right)(M-1)}\right]^T$$

$$e_1 = [1, 0, \ldots, 0]^T,$$

Where, the length of $e_1$ is M, j is an imaginary unit, i is a sequence of the grid points, $$\frac{\theta_r - \theta_l}{w}$$

is a distance between the grid points, $$\theta_l + i\frac{\theta_r - \theta_l}{w}$$

is an angle represented by the $i^{th}$ grid point, $\lambda_q$ and wavelength corresponding to the $q^{th}$ frequency point;

S302: writing out a linear regression problem constrained by L21 norm in an alternating direction method of multipliers (ADMM) framework based on compressive sensing:

$$\min_{\bar{x} \ge 0} \frac{1}{2}\|\bar{A}\bar{x} - \bar{y}_f\|_2^2 + \lambda_t \sum_{i=1}^{w+1} \|z_i\|_2,$$

s.t. $\bar{z} = \bar{x}$,

Where, a column vector $\bar{x} = [x_1^T, \ldots, x_{w+1}^T]^T$ with a length Q(w+1) is a target variable to be solved and represents the magnitude of energy of the frequency points on the estimated grid points, $x_1$ is a sub-vector formed by elements from element (1−1)Q+1 to element 1Q of $\bar{x}$, $x_{w+1}$ is a sub-vector formed by elements from element (w+1−1)Q+1 to element w+1Q of $\bar{x}$, $x_i$ is a sub-vector formed by elements from element (i−1)Q+1 to element iQ of $\bar{x}$, $z_1$ is a sub-vector formed by elements from element (1−1)Q+1 to element 1Q in $\bar{z}$, $z_{w+1}$ is a sub-vector formed by elements from element (w+1−1)Q+1 to element (w+1)Q in $\bar{z}$, $z_i$ is a sub-vector formed by elements from element (i−1)Q+1 to element iQ of $\bar{z}$, $\bar{z} = [z_1^T, \ldots, z_{w+1}^T]^T$ is an auxiliary variable, $\lambda_t$ is a penalty coefficient, $\|\bullet\|_2$ represents taking the 2-norm of a target vector, and a formula of a (k+1)$^{th}$ iteration of the problem is:

$$\bar{x}^{(k+1)} = \left(\Re\left(\bar{A}^H \bar{A}\right) + \rho I\right)^{-1}\left[\Re\left(\bar{A}^H \bar{y}_f\right) + \bar{u}^{(k)} + \rho \bar{z}^{(k)}\right],$$

$$z_i^{(k+1)} = \left(1 - \frac{\lambda_t}{\rho\left\|x_i^{(k+1)} - \frac{1}{\rho}u_i^{(k)}\right\|_2}\right)\left(x_i^{(k+1)} - \frac{1}{\rho}u_i^{(k)}\right), \text{ for } i = 1, 2, \ldots, w+1,$$

$$\bar{u}^{(k+1)} = \bar{u}^{(k)} + \rho\left(\bar{z}^{(k+1)} - \bar{x}^{(k+1)}\right),$$

Where, I is a unit matrix, $\bar{u} = [u_1^T, \ldots, w_{w+1}^T]^T$ is an auxiliary variable, $u_1$ is a sub-vector formed by elements from element (1−1)Q+1 to element 1Q of $\bar{u}$, $u_{w+1}$ is a sub-vector formed by elements from element (w+1-1)Q+1 to element (w+1)Q of $\bar{u}$, $u_i$ is a sub-vector formed by elements from element (i−1)Q+1 to element iQ of $\bar{u}$, the definition of $u_i$ is similar to that of $x_i$, the superscript $(\bullet)^{(k)}$ represents a variable value of a $k^{th}$ iteration, ρ is an iteration step and may be a constant value, $\Re(\bullet)$ represents taking a rear part of a complex number, $x_i^{(k+1)}$ is a sub-vector formed by elements from element (i−1)Q+1 to element iQ of a vector $\bar{x}^{(k+1)}$ generated by the $(k+1)^{th}$ iteration, and a convergence condition is:

$$\left\|\bar{x}^{(k+1)} - \bar{x}^{(k)}\right\|_2 \leq \varepsilon,$$

$\bar{x}^{(k)}$ is a vector obtained by a $k^{th}$ iteration of the target variable $\bar{x}$, and ε is a convergence threshold, which is a small constant greater than 0;

S303: calculating an energy distribution vector $\bar{x}_{L1(2)} = [\|x_1\|_2, \ldots, \|x_{w+1}\|_2]^T$ of the estimated grid points (in the spatial direction) according to a solution $\bar{x} = [x_1^T, \ldots, x_{w+1}^T]^T$ obtained in S302, sorting elements in $\bar{x}_{L1(2)}$, denoting sorted $\bar{x}_{L1(2)}$ as $\tilde{x}_{L1(2)}$, and selecting first $\hat{L}$ elements in $\tilde{x}_{L1(2)}$, which meet:

$$\frac{\sum_{i=1}^{\hat{L}-1}[\tilde{x}_{L1(2)}]_i}{\|\tilde{x}_{L1(2)}\|_1} < \eta \leq \frac{\sum_{i=1}^{\hat{L}}[\tilde{x}_{L1(2)}]_i}{\|\tilde{x}_{L1(2)}\|_1},$$

Where, η is a path recovery threshold and meets 0<η<1, $\|\bullet\|_1$ represents taking the 1-norm of the target vector, $[\bullet]_i$ represents an $i^{th}$ element of the vector, a set formed by subscripts, corresponding to the recovered $\hat{L}$ elements, in the vector $\bar{x}_{L1(2)}$ is denoted as $L = \{\tilde{i}_1, \tilde{i}_2, \ldots \tilde{i}_l \ldots, \tilde{i}_{\hat{L}}\}$, $\tilde{i}_1$ is an original index of the first element in $\bar{x}_{L1(2)}$, $\tilde{i}_2$ is an original index of the second element in $\bar{x}_{L1(2)}$, $\tilde{i}_{\hat{L}}$ is an original index of an $\hat{L}^{th}$ selected element in $\bar{x}_{L1(2)}$, $\tilde{i}_l$ is an original index of an $l^{th}$ selected element in $\bar{x}_{L1(2)}$, and a vector of the direction of arrival of $\hat{L}$ paths in space is:

$$\hat{\theta} = \left[\theta_l + \tilde{i}_1 \frac{\theta_r - \theta_l}{w}, \theta_l + \tilde{i}_2 \frac{\theta_r - \theta_l}{w}, \ldots, \theta_l + \tilde{i}_{\hat{L}} \frac{\theta_r - \theta_l}{w}\right].$$

S4: reconstructing a partial array manifold matrix according to the estimated direction of arrival, and estimating path gain according to instantaneous channel information observed in the frequency domain later, which specifically comprise:

S401: performing FFT on time-domain signals on N actual receiving antennas to obtain Q frequency domain column vector signals with a length N, which are denoted as $\tilde{y}_q$, wherein q is the $q^{th}$ frequency point; constructing the partial array manifold matrix $\tilde{A}_q$ (the size is N×$\hat{L}$) is of uplink receiving antennas on the frequency points, wherein q is the $q^{th}$ frequency point:

$$\tilde{A}_q = [\tilde{a}_{1,q}, \tilde{a}_{2,q} \ldots \tilde{a}_{i,q} \ldots, \tilde{a}_{\hat{L},q}],$$

Where, $\tilde{a}_{1,q}$, $\tilde{a}_{2,q}$, $\tilde{a}_{i,q}$ and $\tilde{a}_{\hat{L},q}$ are steering vectors of the actual activated uplink antennas:

$$\tilde{a}_{i,q} = \left[e^{-j2\pi \frac{d}{\lambda_q} p_1 \cos\left(\theta_l + i\frac{\theta_r - \theta_l}{w}\right)}, e^{-j2\pi \frac{d}{\lambda_q} p_2 \cos\left(\theta_l + i\frac{\theta_r - \theta_l}{w}\right)}, \ldots,\right.$$

$$\left. e^{-j2\pi \frac{d}{\lambda_q} p_n \cos\left(\theta_l + i\frac{\theta_r - \theta_l}{w}\right)}, \ldots, e^{-j2\pi \frac{d}{\lambda_q} p_N \cos\left(\theta_l + i\frac{\theta_r - \theta_l}{w}\right)}\right]^T,$$

$p_n$ is a sequence corresponding to the selected antennas in the uplink array, $p_n = \in \{0, 1, 2, \ldots, M-1\}$, i∈L;

S402: sequentially solving path gain of the paths on the Q frequency points, wherein a gain vector $\hat{\alpha}_q$ of the $\hat{L}$ paths on the q frequency points is:

$$\hat{\alpha}_q = \left(\tilde{A}_q^H \tilde{A}_q + \kappa I\right)^{-1} \tilde{A}_q^H \tilde{y}_q,$$

Where, each element in $\hat{\alpha}_q$ corresponds to the path gain of each path, κ is a minimal constant for ensuring nonsingularity of the matrix during an inversion process;

S5: reconstructing a complete uplink channel according to the estimated path gain and direction of arrival, and transferring it to a downlink channel based on reciprocity, which specifically as follows:

In S5, reconstructing a complete uplink channel according to the path gain estimated in S402 and the direction of arrival estimated in S303 and transferring it to a downlink channel based on reciprocity specifically comprise:

Respectively reconstructing complete M×$\hat{L}$ array manifold matrixes of the uplink receiving antennas on the Q frequency points by:

$$\hat{A}_q = \left[\hat{a}_{1,q}, \hat{a}_{2,q}, \ldots \hat{a}_{i,q} \ldots, \hat{a}_{\hat{L},q}\right], \text{ for } q = 1, 2, \ldots, Q,$$

Where, $\hat{a}_{1,q}$ is a complete steering vector of the $q^{th}$ frequency point at a first angle, $\hat{a}_{2,q}$ is a complete steering vector of the $q^{th}$ frequency point at a second angle, $\hat{a}_{\hat{L},q}$ is a complete steering vector of the $q^{th}$ frequency point at an $L^{th}$ angle, and $\hat{a}_{i,q}$ is a complete steering vector of the $q^{th}$ frequency point at an $i^{th}$ angle:

$$\hat{a}_{i,q} = \left[1, e^{-j2\pi \frac{d}{\lambda_q} \cos\left(\theta_l + i\frac{\theta_r - \theta_l}{w}\right)}, \ldots, e^{-j2\pi \frac{d}{\lambda_q}(M-1)\cos\left(\theta_l + i\frac{\theta_r - \theta_l}{w}\right)}\right]^T, i \in L,$$

Reconstructing M×1 complete channels of all the antennas:

$$\hat{h}_q = \hat{A}_q \hat{\alpha}_q, \text{ for } q = 1, 2, \ldots, Q.$$

In a time division duplex mode, ha is a downlink channel matrix corresponding to the $q^{th}$ frequency point, and a complete downlink channel is:

$$\hat{H} = [\hat{h}_1, \ldots \hat{h}_q \ldots, \hat{h}_Q]$$

Where, $\hat{h}_1$ is a downlink channel matrix corresponding to the first frequency point, and $\hat{h}_Q$ is the downlink channel matrix corresponding to the $q^{th}$ frequency point.

The above embodiment is merely a specific one of the invention, and protection scope of the invention is not limited to the above embodiment. Any transformations or substitutions obtained by those skilled in the art within the technical scope of the invention should fall within the scope of the invention. Thus, the protection scope of the invention should be subject to the claims.

What is claimed is:

1. An asymmetric massive MIMO (Multiple Input Multiple Output) channel estimation method based on a co-prime array, comprising:
   S1: establishing an uplink and downlink asymmetric massive MIMO system based on the co-prime array, wherein the uplink and downlink asymmetric massive MIMO system comprises a base station provided with ultra-large-scale antennas and users, the number of users is K, each user has a single antenna of K antennas, the number of the ultra-large-scale antennas of the base station is M, all the ultra-large-scale antennas of the base station have transmitting radio-frequency links, only N receiving radio-frequency links are available to be connected to N antennas within the ultra-large-scale antennas to receive uplink signals, and the users communicate with the base station by means of Q frequency points; M=mn+1, and N=m+n−1, where m<n, and m and n are co-prime; selecting uplink receiving antennas according to the co-prime array, and connecting the selected uplink receiving antennas to the receiving radio-frequency links;
   S2: receiving and estimating, by the base station, uplink channel information of part of the ultra-large-scale antennas, and constructing, after the uplink channel information is transformed to a frequency domain and is screened and rearranged, a virtual linear uniform array;
   S3: stretching virtual array information in the virtual linear uniform array to construct an observation matrix, then according to the observation matrix, constructing a group least absolute shrinkage and selection operator based on compressive sensing by means of spatial sparse characteristics to estimate a direction of arrival;
   S4: reconstructing a partial array manifold matrix according to the estimated direction of arrival, and estimating path gain according to instantaneous channel information observed in the frequency domain later; and
   S5: reconstructing a complete uplink channel according to the estimated path gain and direction of arrival, and reconstructing a downlink channel based on reciprocity.

2. The asymmetric massive MIMO channel estimation method according to claim 1, wherein
   in S1, the uplink receiving antennas are selected specifically by: selecting N antennas which comprise first consecutive n antennas, $(2n+1)^{th}$ antenna, $(3n+1)^{th}$ antenna, . . . , and $(mn+1)^{th}$ antenna, where N=m+n−1, a distance d between the antennas is $\lambda_{min}/2$, and $\lambda_{min}$ is a wavelength corresponding to a subcarrier with a maximum frequency in each frequency point.

3. The asymmetric massive MIMO channel estimation method according to claim 1, wherein
   in S2, receiving and estimating, by the base station, the uplink channel information of part of the ultra-large-scale antennas and constructing, after the uplink channel information is transformed to a frequency domain and is screened and rearranged, the virtual linear uniform array specifically comprise:
   S201: within P successive symbol durations, respectively performing Q-point FFT (Fast Fourier Transform) on P groups of Q discrete time-domain signals received by an uplink antenna array including the selected N antennas to obtain frequency domain signals on P groups of Q frequency points, wherein a column vector $x_{p,q}$ with a length N×1 is denoted as the frequency domain signal corresponding to a $q^{th}$ frequency point in a $P^{th}$ group of signals;
   S202: performing autocorrelation processing on P frequency domain signals on each frequency point to obtain $Q^{N \times N}$ autocorrelation matrixes:

$$R_q = \frac{1}{P}\sum_{p=1}^{P} x_{p,q} x_{p,q}^H, \text{ for } q = 1, \ldots, Q,$$

classifying and averaging array elements at repetitive positions in $R_q$, and then arranging the array elements in sequence to form a column vector $y_q$ with a length M×1; and
   S203: forming a column vector with a length QM by virtual array signals on all the frequency points:

$$\bar{y}_f = [y_1^T, \ldots, y_i, \ldots, y_Q^T]^T,$$

where, a column vector $y_i$ with a length M is the frequency signal on an $l^{th}$ frequency point.

4. The asymmetric massive MIMO channel estimation method according to claim 3, wherein
   a specific selection process in S202 comprises:
   from one end of a complete array, denoting serial numbers of the ultra-large-scale antennas as 0, 1, 2, . . . , M−1, making the serial number of an activated the uplink antenna array as a set $\{p_1, p_2, \ldots, p_N\}$ with a length N, and arranging the set by column to form a matrix $T_c$ with a length N×N:

$$T_c = \underbrace{\begin{bmatrix} p_1 & \cdots & p_1 \\ \vdots & \cdots & \vdots \\ p_N & \cdots & p_N \end{bmatrix}}_{N columns},$$

wherein, elements in the autocorrelation matrix $R_q$ are in one-to-one correspondence with elements in $R_{tab}=T_c-T_c^T$, that is, an element $[R_q]_{i,j}$ in the $i^{th}$ row and $j^{th}$ column of $R_q$ is an element at the position $[R_{tab}]_{i,j}$ of the virtual array.

5. The asymmetric massive MIMO channel estimation method according to claim 4, wherein
   in S3, an estimation problem is constructed by means of the group least absolute shrinkage and selection operator based on compressive sensing and is solved in an Alternating Direction Method of Multipliers (ADMM) optimization framework to estimate the direction of arrival, which specifically comprises:
   S301: constructing an observation matrix $\bar{A}=[A_1, \ldots A_i, \ldots, A_w, \bar{I}]$ of QM×Q(w+1) within a preset incident angle interval $[\theta_l, \theta_r]$, wherein $\theta_l, \theta_r$ are a left angle boundary and a right angle boundary respectively and meet $0 \le \theta_l < \theta_r \le \pi$, w is the number of grid points within an estimation interval $[\theta_l, \theta_r]$, a sub-matrix $A_i$ of QM×Q is an observation matrix on an $l^{th}$ grid point, $\bar{I}$ is a matrix used for noise estimation, and the sub-matrixes are generated by:

$$A_i = \begin{bmatrix} a_{i,1} & \cdots & 0 \\ \vdots & \ddots & \vdots \\ 0 & \cdots & a_{i,Q} \end{bmatrix}, \bar{I} = \begin{bmatrix} e_1 & \cdots & 0 \\ \vdots & \ddots & \vdots \\ 0 & \cdots & e_1 \end{bmatrix},$$

$a_{l,q}$ is a steering vector of the $q^{th}$ frequency point on the $l^{th}$ grid point, and:

$$a_{l,q} = \left[1, e^{-j2\pi\frac{d}{\lambda_q}\cos\left(\theta_l + i\frac{\theta_r-\theta_l}{w}\right)}, \ldots, e^{-j2\pi\frac{d}{\lambda_q}\cos\left(\theta_l + i\frac{\theta_r-\theta_l}{w}\right)(M-1)}\right]^T,$$

$$e_1 = [1, 0, \ldots, 0]^T,$$

where, the length of $e_1$ is M, j is an imaginary unit, i is a sequence of the grid points, $$\frac{\theta_r - \theta_l}{w}$$

is a distance between the grid points, $$\theta_l + i\frac{\theta_r - \theta_l}{w}$$

is an angle represented by the $l^{th}$ grid point, and $\lambda_q$ is a wavelength corresponding to the $q^{th}$ frequency point;

S302: writing out a linear regression problem constrained by L21 norm of matrix in the ADMM framework based on compressive sensing:

$$\min_{\bar{x}\geq 0} \frac{1}{2}|\bar{A}\bar{x} - \bar{y}_f|_2^2 + \lambda_t \sum_{i=1}^{w+1} |z_i|_2$$

$$\text{s.t. } \bar{z} = \bar{x},$$

where, a column vector $\bar{x}=[x_1^T, \ldots, x_{w+1}^T]^T$ with a length Q(w+1) is a target variable to be solved and represents the magnitude of energy of the frequency points on the estimated grid points, $x_i$ is a sub-vector formed by elements from element $(i-1)Q+1$ to element $iQ$ of $\bar{x}$, $z_i$ is a sub-vector formed by elements from element $(i-1)Q+1$ to element $iQ$ of $\bar{z}$, $\bar{z}=[z_1^T, \ldots, z_{w+1}^T]^T$ is an auxiliary variable, $\lambda_t$ is a penalty coefficient, and a formula of a $(k+1)^{th}$ iteration of the problem is:

$$\bar{x}^{(k+1)} = \left(\Re\left(\bar{A}^H\bar{A}\right) + \rho I\right)^{-1}\left[\Re\left(\bar{A}^H\bar{y}_f\right) + \bar{u}^{(k)} + \rho\bar{z}^{(k)}\right]$$

$$z_i^{(k+1)} = \left(1 - \frac{\lambda_t}{\rho|x_i^{(k+1)} - \frac{1}{\rho}u_i^{(k)}|_2}\right)\left(x_i^{(k+1)} - \frac{1}{\rho}u_i^{(k)}\right), \text{ for } i = 1, 2, \ldots, w+1$$

$$\bar{u}^{(k+1)} = \bar{u}^{(k)} + \rho\left(\bar{z}^{(k+1)} - \bar{x}^{(k+1)}\right)$$

where, I is a unit matrix, $u=[u_1^T, \ldots, u_{w+1}^T]^T$ is an auxiliary variable, $u_i$ is a sub-vector formed by elements from element $(i-1)Q+1$ to element $iQ$ of $\bar{u}$, $\rho$ is an iteration step, $x_i^{(k+1)}$ is a sub-vector formed by elements from element $(i-1)Q+1$ to element $iQ$ of a vector $\bar{x}^{(k+1)}$ generated by the $(k+1)^{th}$ iteration, and a convergence condition is:

$$|\bar{x}^{(k+1)} - \bar{x}^{(k)}|_2 \leq \varepsilon,$$

$\bar{x}^{(k)}$ is a vector obtained by a $k^{th}$ iteration of the target variable $\bar{x}$, and $\varepsilon$ is a convergence threshold, which is a small constant greater than 0; and S303: calculating an energy distribution vector $\bar{x}_{L1(2)}=[\|x_1\|_2, \ldots, \|x_{w+1}\|_2]^T$ of the estimated grid points according to a solution $\bar{x}=[x_1^T, \ldots, x_{w+1}^T]^T$ obtained in S302, sorting elements in $\bar{x}_{L1(2)}$, denoting sorted $\bar{x}_{L1(2)}$ as $\tilde{x}_{L1(2)}$, and selecting first $\hat{L}$ elements in $\tilde{x}_{L1(2)}$, which meet:

$$\frac{\sum_{i=1}^{\hat{L}-1}[\tilde{x}_{L1(2)}]_i}{\|\tilde{x}_{L1(2)}\|_1} < \eta \leq \frac{\sum_{i=1}^{\hat{L}}[\tilde{x}_{L1(2)}]_i}{\|\tilde{x}_{L1(2)}\|_1},$$

where, $\eta$ is a path recovery threshold and meets $0<\eta<1$, a set formed by subscripts, corresponding to the recovered $\hat{L}$ elements, in the vector $\bar{x}_{L1(2)}$ is denoted as $L=\{\tilde{i}_1, \tilde{i}_2, \ldots \tilde{i}_l, \ldots, \tilde{i}_{\hat{L}}\}$, $\tilde{i}_l$ is an original index of an $l_{th}$ selected element in $\bar{x}_{L1(2)}$, and a vector of the direction of arrival of $\hat{L}$ paths in space is:

$$\hat{\theta} = \left[\theta_l + \tilde{i}_1\frac{\theta_r-\theta_l}{w}, \theta_l + \tilde{i}_2\frac{\theta_r-\theta_l}{w}, \ldots, \theta_l + \tilde{i}_{\hat{L}}\frac{\theta_r-\theta_l}{w}\right].$$

6. The asymmetric massive MIMO channel estimation method according to claim 5, wherein in S4, reconstructing the partial array manifold matrix according to the estimated direction of arrival and estimating path gain according to instantaneous channel information observed in the frequency domain later specifically comprise:

S401: performing FFT on time-domain signals on the selected N actual receiving antennas to obtain Q frequency domain column vector signals with a length N, which are denoted as $\tilde{y}_q$, wherein q is the $q^{th}$ frequency point; constructing the partial array manifold matrix $\tilde{A}_q$ of uplink receiving antennas on the frequency points, wherein q is the $q^{th}$ frequency point:

$$\tilde{A}_q = [\tilde{a}_{1,q}, \tilde{a}_{2,q}, \ldots, \tilde{a}_{i,q}, \ldots, \tilde{a}_{\hat{L},q}],$$

where, $\tilde{a}_{1,q}, \tilde{a}_{2,q}, \tilde{a}_{i,q}$ and $\tilde{a}_{\hat{L},q}$ are steering vectors of the actual activated uplink selected N antennas:

$$\tilde{a}_{i,q} = \left[e^{-j2\pi\frac{d}{\lambda_q}p_1\cos\left(\theta_l+i\frac{\theta_r-\theta_l}{w}\right)},\right.$$
$$e^{-j2\pi\frac{d}{\lambda_q}p_2\cos\left(\theta_l+i\frac{\theta_y-\theta_l}{w}\right)}, \ldots, e^{-j2\pi\frac{d}{\lambda_q}p_n\cos\left(\theta_l+i\frac{\theta_y-\theta_l}{w}\right)}, \ldots$$
$$\left. e^{-j2\pi\frac{d}{\lambda_q}p_N\cos\left(\theta_l+i\frac{\theta_r-\theta_l}{w}\right)}\right]^T$$

$p_n$ is a sequence corresponding to the selected antennas in the uplink antenna array, $p_n \in \{0, 1, 2, \ldots, M-1\}$, $i \in L$;

S402: sequentially solving path gain of the paths on the ~ frequency points, wherein a gain vector $\hat{\alpha}_q$ of the $\hat{L}$ paths on the q frequency points is:

$$\hat{\alpha}_q = \left(\tilde{A}_q^H\tilde{A}_q + \kappa I\right)^{-1}\tilde{A}_q^H\tilde{y}_q,$$

where, each element in $\hat{\alpha}_q$ corresponds to the path gain of each path, K is a minimal constant for ensuring nonsingularity of the matrix during an inversion process.

7. The asymmetric massive MIMO channel estimation method according to claim 6, wherein in S5, reconstructing the complete uplink channel according to the path gain estimated in S402 and the direction of arrival estimated in S303 and reconstructing the downlink channel based on reciprocity specifically comprise:

respectively reconstructing complete $M \times \hat{L}$ array manifold matrixes of the uplink receiving antennas on the Q frequency points by:

$$\hat{A}_q = \left[\hat{a}_{1,q}, \hat{a}_{2,q}, \ldots \hat{a}_{i,q} \ldots, \hat{a}_{\hat{L},q}\right], \text{ for } q = 1, 2, \ldots, Q$$

where, $\hat{a}_{i,q}$ is a complete steering vector of the $q^{th}$ frequency point at an $l^{th}$ angle:

$$\hat{a}_{i,q} = \left[1, e^{-j2\pi \frac{d}{\lambda_q} \cos\left(\theta_l + i\frac{\theta_r - \theta_l}{w}\right)}, \ldots, e^{-j2\pi \frac{d}{\lambda_q}(M-1)\cos\left(\theta_l + i\frac{\theta_r - \theta_l}{w}\right)}\right]^T, i \in L,$$

reconstructing $M \times 1$ complete channels of all the ultra-large-scale antennas:

$$\hat{h}_q = \hat{A}_q \hat{\alpha}_q, \text{ for } q = 1, 2, \ldots, Q;$$

in a time division duplex mode, $\hat{h}_q$ is a downlink channel matrix corresponding to the $q^{th}$ frequency point, and a complete downlink channel is:

$$\hat{H} = [\hat{h}_1, \ldots \hat{h}_q \ldots, \hat{h}_Q],$$

where, $\hat{h}_1$ is a downlink channel matrix corresponding to the first frequency point, and $\hat{h}_Q$ is the downlink channel matrix corresponding to the $q^{th}$ frequency point.

* * * * *